United States Patent [19]

Morikawa et al.

[11] Patent Number: 4,856,573
[45] Date of Patent: Aug. 15, 1989

[54] PNEUMATIC TIRE

[75] Inventors: Tuneo Morikawa, Hadano; Kazuyuki Kabe; Shuichi Tsukada, both of Hiratsuka, all of Japan

[73] Assignee: The Yokohama Rubber Co., Ltd., Tokyo, Japan

[21] Appl. No.: 97,417

[22] Filed: Sep. 15, 1987

Related U.S. Application Data

[63] Continuation of Ser. No. 724,154, Apr. 18, 1984, abandoned.

[30] Foreign Application Priority Data

Apr. 18, 1984 [JP] Japan ................................ 59-76650

[51] Int. Cl.4 ............................................. B60C 9/02
[52] U.S. Cl. ..................................... 152/556; 152/548
[58] Field of Search ............... 152/451, 458, 556, 558, 152/548, 564; 57/902

[56] References Cited

U.S. PATENT DOCUMENTS

| | | | |
|---|---|---|---|
| 3,419,059 | 12/1968 | Bridge, Jr. | 152/556 |
| 3,638,706 | 2/1972 | Wilson et al. | 152/451 X |
| 3,851,692 | 12/1974 | Takemura et al. | 152/556 X |
| 3,977,172 | 8/1976 | Kerawalla | 57/902 X |
| 4,155,394 | 5/1979 | Shepherd et al. | 152/556 X |
| 4,177,852 | 12/1979 | Merli et al. | 152/556 X |
| 4,286,645 | 9/1981 | Boileau | 152/558 X |
| 4,389,839 | 6/1983 | van der Werff | 152/556 X |

FOREIGN PATENT DOCUMENTS 49-120303 11/1974 Japan.
58-43802 3/1983 Japan ........................... 152/556

Primary Examiner—Raymond Hoch
Attorney, Agent, or Firm—Finnegan, Henderson, Farabow, Garrett & Dunner

[57] ABSTRACT

A pneumatic tire is improved by use of carcass cords being made from aromatic polyamide fiber and having a twisting angle of 31.3 to 39.3 degree. Durability is much improved.

1 Claim, 1 Drawing Sheet

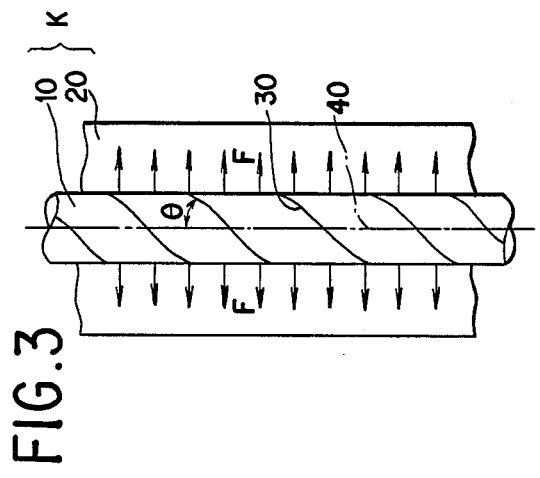
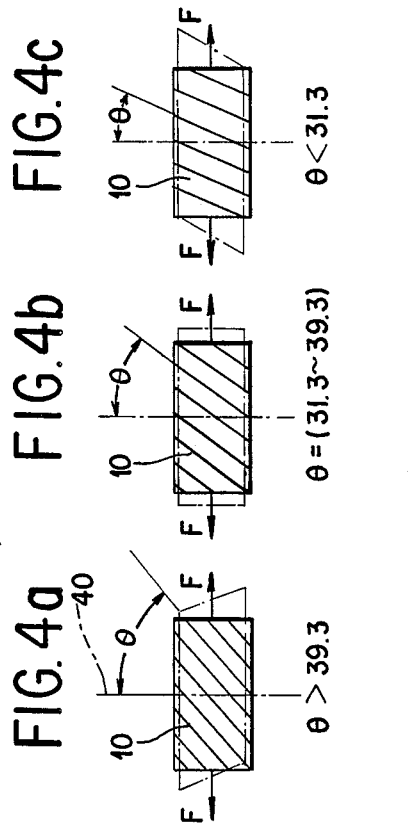
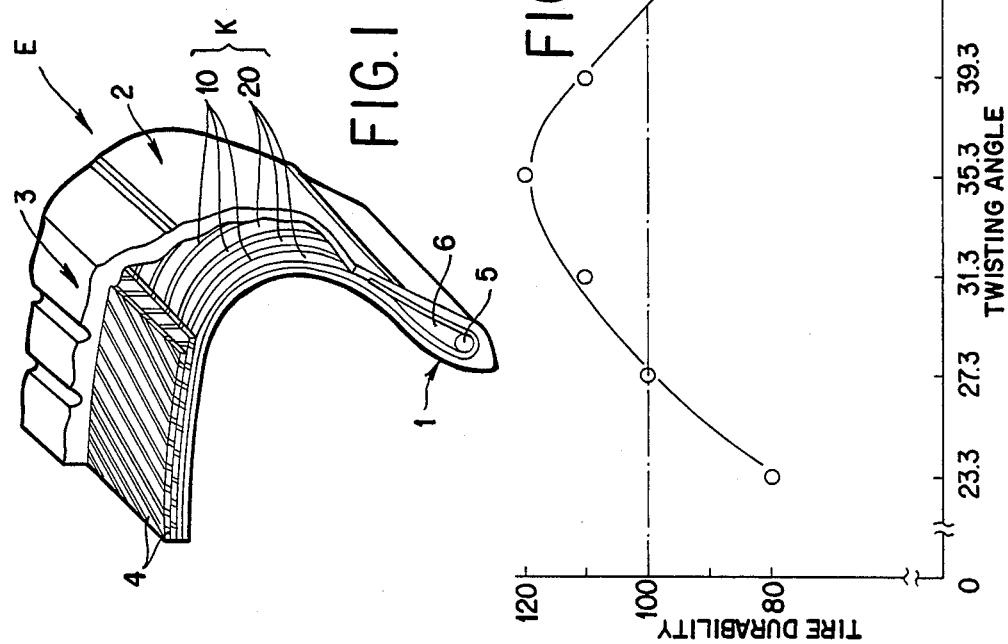

PNEUMATIC TIRE

This application is a continuation of application Ser. No. 724,154 filed Apr. 18, 1984, abandoned.

This invention relates to a pneumatic tire which comprises bead portions, side wall portions, a tread portion and carcass layers of carcass cords and a carcass coat the carcass cords being each composed of aromatic polyamide fiber and have a twisting angle of 31.3 to 39.3 degree. The invention provides a pneumatic tire with an unexpected improved durability.

A carcass layer, one of the important constructional elements of a pheumatic tire, is formed by covering carcass cords, which each extend apart from one another, integrally with rubber coats. Nylon cords, rayon cords and polyester cords have been used as carcass cords in the prior state of arts.

However, those carcass cords have a strength of only 5-10 g/d. Therefore, it is necessary in a tire of a certain size that at least two carcass layers be provided. This is a bar to save a weight of the tire and improve productivity.

Use of cords of an aromatic polyamide fiber having a higher strength than the above-mentioned material has recently been proposed.

When the aromatic polyamide fiber cords are used as the carcass cords, only one carcass layer is sufficient to serve even in a tire having a size of not less than 195/70R14 for a large-sized passenger car. This will reduce a weight of a tire and improve productivity of a tire.

It is, however, noted that the aromatic polyamide fiber cords are not superior to nylon cords, rayon cords and polyester cords in respect to adhesion to the coat rubber. As a result it will involve separation between the carcass cords and the rubber coats while the tire is in use. This phenomenon is easy to occur, especially, in the end portions of a carcass layer. A serious problem which are wound up around the bead wires actually gives rise because it causes a great decrease in the durability of a tire.

In order to overcome the above shown problems, the invention provides an improvement by use of carcass cords which comprise fiber of an aromatic polyamide and have a twisting angle of 31.3 to 39.3 degrees. The twisting angle is the smaller angle between the axis of the cord and the contour line of the twisted cord. More precisely, the twisting angle is the smaller angle between the axis of the cord and the tangent line, at the cross point of the axis and the contour line, of the contour line of the twisted cord. The improvement of the invention provides more close contact and more strong adhesion between the carcass cords and the carcass coat. As a result, durability is greately increased in the invention.

BRIEF DESCRIPTION OF THE DRAWINGS

FIG. 1 is an illustration of an embodiment of a pneumatic tire according to the present invention of which a part has bee cut out.

FIG. 2 is a graph showing the relation between a twisting angle $\theta$ of carcass cords and durability of the tire;

FIG. 3 is an enlarged view of a part of a carcass layer; and

FIGS. 4a, 4b and 4c each illustrate shearing deformation in carcass cords having a specified twisting angle when a force F has been applied thereto at the direction perpendicular to the axis of the cord.

The present invention will now be described in detail on the basis of embodiments with reference to the drawings.

FIG. 1 is a perspective view of an embodiment of a pneumatic tire according to the present invention.

Referring to the drawing, reference letter E denotes an embodiment of a pneumatic tire according to the present invention, which consists of left and right bead portions 1, left and right side wall portions 2 continuing from the respective bead portions 1, and a tread portion 3 positioned between these side wall portions 2. Between the left and right bead portions 1, a carcass layer K extends, in which the carcass cords each extend at substantially 90° to the circumferential direction of the tire. In addition, two belt layers 4 are provided at the tread portion 3 on the carcass layer K so that the two belt layers may cross each other at 10°-35° to the circumferential direction of the tire in relation to an angle of the cord.

In the present invention, aromatic polyamide fiber cords are used as carcass cords 10 which constitute the carcass layer K. A twisting angle $\theta$ of these cords 10 is set in the range between 31.3° and 39°3.

When a twisting angle $\theta$ is less than 31.3°, adhesion of the carcass cord 10 to the coat rubbers 20 cannot be improved and therefore durability of the tire cannot be improved, either. When a twisting angle $\theta$ of the cords 10 exceeds 39.3+, adhesion of the carcass cords 10 to the coat rubbers 20 cannot be improved, and as a result durability of the tire cannot be improved, either. In addition, it is difficult to twist the aromatic polyamide fiber cords at so high an angle. Such cords are easily damaged, physical properties are so undesirably changed. That improvement of durability of the tire may not be attained.

Aromatic polyamide fiber cords to be used in this embodiment are obtained by twisting raw aromatic polyamide fiber yarn, which has a tensible strength of 150 kg/mm$^2$ or above and Young's modulus of 3000 kg/mm$^2$ or above at a twisting angle $\theta$ within the range of 31.3° and 39.3°; and coating the surfaces of the resultant cords with an adhesive.

In this embodiment, the number of carcass cords 10 per 50 mm of the carcass layer K is 35 in the equatorial plane in the tire.

The number of carcass cords 10 per 50 mm of the carcass layer K is preferably in the range of 20-60. When the number is less than 20, a distance between the adjacent carcass cords is too wide. In this case, the rubber coats 20 to cover the carcass cords 10 integrally easily flow out of the rubber coats 20 during the vulcanization step in the tire-manufacturing process. This will result in a failure in vulcanization. When the number exceeds 60, a distance between the adjacent carcass cords 10 is too narrow. The rubber to coat them is difficult to enter into space between the carcass cords 10. Consequently, adhesion strength between the carcass cords 10 and the rubber coats 20 decreases, and durability of the tire also decreases accordingly. Moreover, the total number of carcass cords 10 is too large. This will increase the tire-manufacturing cost.

The number of the carcass coards 10 per 50 mm of the carcass layer K in the equatorial plane of the tire is more preferably in the range of 25-40 for the reasons given above.

The 100% modulus of the rubber coats 20 is preferably in the range of 30 kg/cm² and 70 kg/cm². When the modulus of the rubber coats 20 is less than 30 kg/cm², adhesion between the carcass cords 10 and the rubber coats 20 cannot be improved since the modulus of the aromatic polyamide fibber cords is high. Accordingly, durability of the tire cannot be improved. When the modulus of the rubber coats 20 exceeds 70 kg/cm², the rubber coats 20 is too rigid. This is disadvantageous in the production of the tire, and will increase the tire-manufacturing cost.

Refering to the drawing, reference numeral 5 denotes a bead wire, and 6, a bead filler.

(Experimental Example)

An experimental Example will now be described.
Performance of the tire to be tested and test procedures follows. Radial tires for passenger cars were used.

(Performance of the pneumatic tire)

Tire size: 195/70HR14
Carcass layer:
(a) A single carcass layer was provided so as to have an angle of carcass cords of substantially 90° with respect to the circumferential direction of the tire.
(b) The carcass cords consisted of 1000 d/2 aromatic polyamide fiber.
(c) The number of carcass cords per 50 mm of the carcass layer in an equatorial plane of the tire was 35.
(d) The 100% modulus of the coat rubbers was 47 kg/cm².
Belt layer:
(a) Two belt layers were provided and crossed each other. The cords extended at an angle of 20° with respect to the circumferential direction of the tire.
(b) The belt cords consisted of steel cords of 1×5 (0.25).

The carcass cords constituting the carcass layers varied in a twisting angle $\theta$ as 23.3°, 27.3°, 31.3°, 35.3°, 39.3° and 43.3°.

(Test conditions)

Rim: 5 1/2JJ×14
Air pressure: 2.1 kg/cm²
Diameter of the drum: 1707 mm
Speed: 80 km/hr The tires were each tested under the above test conditions at an initial load of 525 kg. The load was increased by 50 kg every 2 hours. A running distance where the tire had been travelling until the tire broke down was measured. The measurement result is shown by index determined by that of index of a conventional tire is 100.

Results are shown in FIG. 2.

FIG. 2 is a graph showing the relation between the twisting angle $\theta$ of the carcass cords and durability of the tires. The running distance measured before the tires broken, i.e. an index showing durability of the tires is expressed on the ordinate. A twisting angle $\theta$ of the cords is on the abscissa.

It is understood from FIG. 2 that the pneumatic tire according to the present invention, in which aromatic polyamide fiber cords were used as carcass cords and these cords have a twisting angle $\theta$ in the range of 31.3°–39.3°, was greatly improved in durability, as compared with a conventional tire in which the carcass cords have a twisting angle $\theta$ of 27.3°.

Especially, durability of a pneumatic tire according to the present invention having a twisting angle $\theta$ 35.3° is improved by 120% based on the conventional tire having a twisting angle $\theta$ of 27.3°.

This durability-improving effect of the present invention is explained below in reference to FIG. 3. When the twisting angle $\theta$ is set in the range of 31.3°–39.3°, the shearing deformation hardly occurs in the carcass cords 10 on the whole even by the force F applied perpendicularly to the axis of the carcass.

This is explained on the basis of the fundamental idea concerning deformation characteristics of FRR (Fiber-reinforced Rubber) in the mechanics of complex materials. When a twisting angle $\theta$ of the carcass cords 10 is less than 31.3°, the shape of the carcass cords 10 is changed into a rightwardly-inclined parallelogram by the force F applied perpendicularly to the carcass cord. This is shown by a two-dot chain line in FIG. 4c. The shearing deformation occurs. Consequently, separation occurs in the interface between the carcass cords 10 and the rubber coats 20 while the wheel runs, so that the durability of the tire cannot be improved.

When a twisting angle $\theta$ of the carcass cords 10 exceeds 39.3°, the shape of the carcass cords 10 is changed into a leftwardly-inclined parallelogram by the force F applied perpendicularly to the carcass layer. This is shown by a two-dot chain line in FIG. 4a. The shearing deformation occurs. Consequently, separation occurs in the interface between the carcass cords 10 and the rubber coats 20 while the wheel runs, so that the durability of the tire cannot be improved.

When a twisting angle $\theta$ of the cords 10 is in the range of 31.3°–39.3° According to the present invention, the carcass cords 10 are not easily deformed even by a force F applied perpendicularly to the carcass cord. This is shown by a two-dot chain line in FIG. 4b. The shearing deformation of the cords 10 hardly occurs in this case. Consequently, separation does not occur in the interface between the carcass cords 10 and the rubber coats 20, and the durability of the tire can be greatly improved.

In the above illustrated examples of the invention tire, the twisting angle appears in FIG. 3 and FIG. 4. In FIG. 3, two yarns or strands have been twisted in combintion and the line 30 running diagonally against the axis of the cord 40 is a contour line of the yarn twisted. In FIG. 4, the diagonal line merely indicates the direction of the contour line, not the contour line itself.

The embodiments of the invention in which an exclusive property or privilege is claimed are defined as follows:

1. In a pneumatic tire which comprises bead portions, side wall portions, a tread portion and carcass layers of carcass cords and a carcass coat, the improvement comprising said carcass cords each consisting of fiber of raw aromatic polyamide yarn having a tensile strength of at least 150 kg/mm² and a Young's modulus of at least 3000 kg/mm², with a twisting angle of 31.3 to 39.3 degrees, the number of carcass cords per 50 mm of carcass layer is 20 to 60 and wherein the carcass coat is rubber and has a 100% modulus of 30% to 70 kg/cm².

* * * * *